United States Patent [19]
Nykopp et al.

[11] 3,747,181
[45] July 24, 1973

[54] PRESS ROLL
[75] Inventors: Erik Albert Nykopp; Leino Yrio Utriainen, both of Tampere, Finland
[73] Assignee: Oy Tampella AB, Tampere, Finland
[22] Filed: Jan. 18, 1972
[21] Appl. No.: 218,701

[30] Foreign Application Priority Data
  Jan. 19, 1971  Finland........................... 125

[52] U.S. Cl. ............................................ 29/113 AD
[51] Int. Cl. ............................................. B21b 31/32
[58] Field of Search ................ 29/116 AD, 113 AD, 29/116 R

[56] References Cited
UNITED STATES PATENTS
| | | | |
|---|---|---|---|
| 3,050,829 | 8/1962 | Appenzeller | 29/113 AD |
| 3,119,324 | 1/1964 | Justus | 29/116 AD X |
| 3,131,625 | 5/1964 | Kusters et al. | 29/116 AD X |
| 3,389,450 | 6/1968 | Robertson | 29/116 AD |
| 3,618,190 | 11/1971 | Vernozza et al. | 29/116 AD |

FOREIGN PATENTS OR APPLICATIONS
1,146,022  3/1963  Germany........................... 29/116 R Primary Examiner—Alfred R. Guest
Attorney—D. C. Roylance, David S. Abrams et al.

[57] ABSTRACT

In a press roll, which has an outer rotating roll mantle and, fitted inside the mantle, a core, which works as the supporting and fixing axle and against which one or several pressure cylinders directed toward the press nip have been propped at one end, the rotating roll mantle has been attached with bearings onto the fixed supporting mantle surrounding the core and the other ends of the pressure cylinders arranged to actuate the supporting mantle.

5 Claims, 3 Drawing Figures

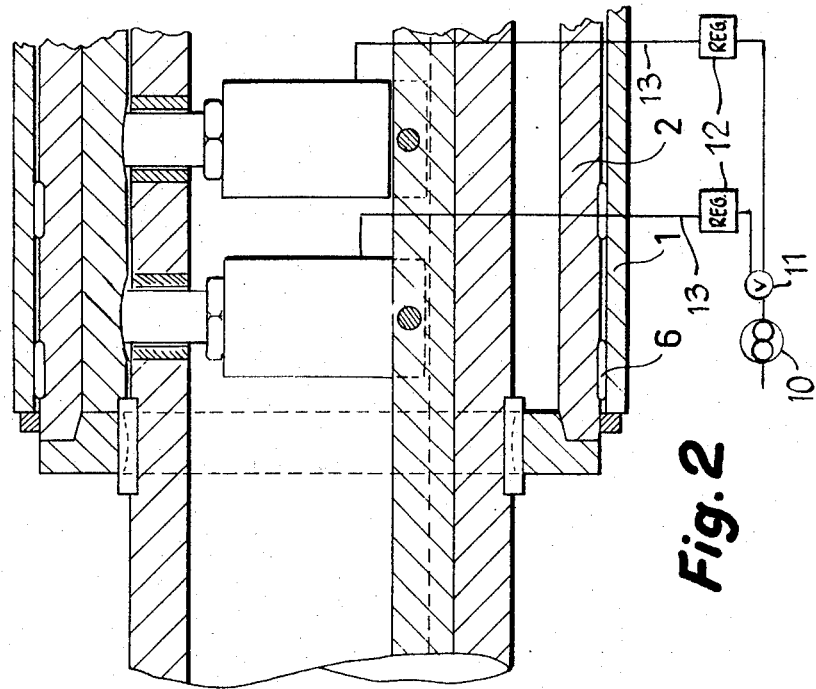
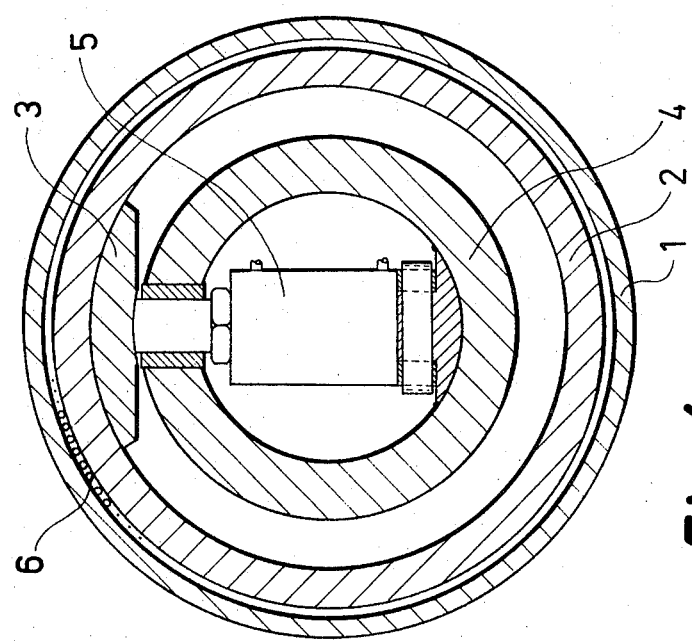

PRESS ROLL

BACKGROUND OF THE INVENTION

1. Field of the Invention

The invention relates to the field of press rolls and specifically to a press roll having an outer rotating roll mantle and, fitted inside the mantle, a stationary core or supporting axle.

2. Description of the Prior Art

Rolls like this are used, for example, as press rolls in paper machines in order to obtain a satisfactory removal of water from a paper web or felt, and they are usually somehow supported so that their mantle surface cannot bend.

Press rolls have to take great stresses because a paper web or felt runs between two press rolls which create a high pressure at the contact point between the track and the rolls.

Several different solutions have been suggested for counteracting the stress directed at the press rolls. It is a known method to support a press roll from the inside with pressure cylinders which have been attached to a stationary core. A press roll like this has been introduced in U.S. Pat. No. 3,131,625. It has a stationary, rigid core to which several pressure cylinders have been fitted. A curved slide shoe has been attached with a bar to the piston of each cylinder. The slide shoes have been fitted so that they reach at the most 90° to each side of the pressing point — thus they cover about half of the inner surface of the mantle at the respective points. A roll such as this has, however, several disadvantages, the greatest being that it cannot take shocks and stresses which possibly affect the roll on, for example, the side opposite to the press nip, because the slide shoe covers only part of the inner surface of the rotating roll mantle. Also, the unsupported part of the rotating roll mantle is sensitive to different vibrations.

Other press rolls of this type are also known from, for example, U.S. Pat. Nos. 2,908,964, 3,023,695, 3,119,324, 3,230,604, Canadian Pat. No. 728,431, and Swedish Pat. No. 198,325, but they all have the same disadvantages as U.S. Pat. No. 3,131,625 mentioned above — namely, that the rotating roll mantle is supported only at the pressing point and a little on each side of it.

SUMMARY OF THE INVENTION

According to the invention there is provided a press roll provided with a coaxial cylindrical mantle between the rotatable roll mantle and the supporting axle and adapted to be actuated by the other end of the pressure cylinder; means for fixedly mounting the coaxial cylindrical mantle on the supporting axle; and bearings in the interstice between the rotatable cylindrical roll mantle and the non-rotatable coaxial cylindrical mantle.

Thus there is provided a press roll, which is structurally sturdy and not susceptible to vibrations, for its rotating roll mantle has been attached with bearings onto a stationary supporting mantle.

BRIEF DESCRIPTION OF THE DRAWINGS

FIG. 1 shows a cross section of a pressing roll according to the invention at one pressure cylinder, FIG. 2 shows a partial longitudinal section of a pressing roll.

DESCRIPTION OF THE PREFERRED EMBODIMENTS

Figure 3:
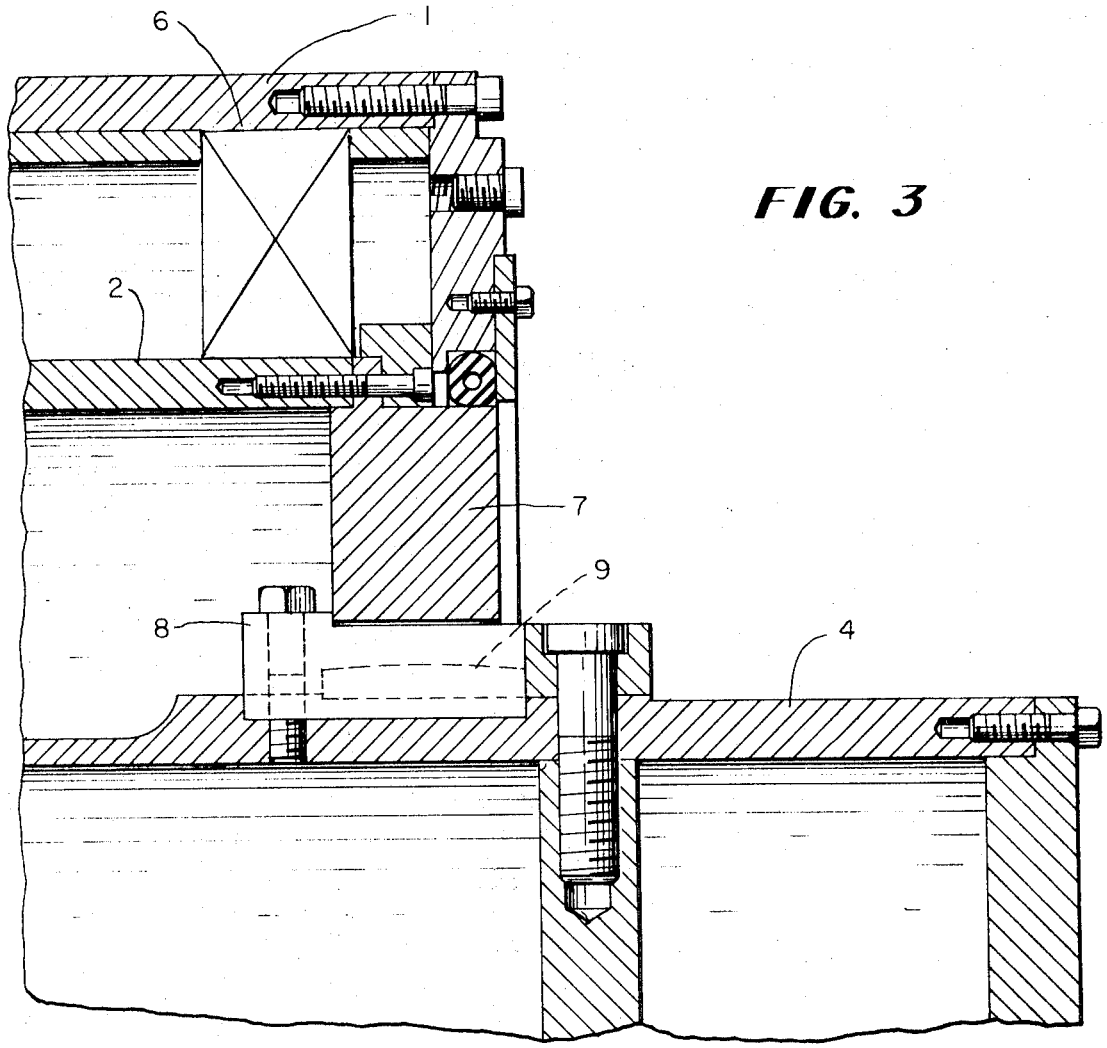
FIG. 3 shows a partial longitudinal section of a preferred embodiment.

The press roll shown in FIG. 1 consists of outer rotating roll mantle 1, which has been attached with bearings onto stationary supporting mantle 2. Rail 3, which is situated at the press nip, has been attached to the inner surface of supporting mantle 2. Several parallel pressure cylinders 5, placed next to each other inside circular core 4, which runs through the pressing roll and works as its supporting and fixing axle, have been connected to rail 3 with sturdy bars attached to the pistons — one of the cylinders is shown in the figure. Core 4 is hollow, and pressure cylinders 5 have been propped at one end against its inner surface and run, parallel to its diameter, through its circumference on the opposite side. Pressure cylinders 5 have been placed along the axial line of the inner surface of the supporting axle at the press nip, and they are either pneumatic or hydraulic, and by regulating them separately or together force is transferred to supporting mantle 2 of the press roll so that the roll stays straight and will not bend downwards under the force affecting it at the press nip. Actuation of the pressure cylinders can be accomplished as schematically illustrated by using a fluid pressure source shown as pump 10 to supply pressurized fluid to the cylinders, a pressure control valve 11, and pressure regulators 12 in lines 13. Rotating roll mantle 1 has been attached onto the supporting mantle with either sliding or roller bearings 6. In the latter case the roller or needle bearings have been placed in closed spaces as shown in FIG. 2, which are protected from impurities and filled with oil or some other lubricant.

FIG. 3 shows in detail the mounting of the rotatable roll mantle 1 and the fixed mantle 2 to the core 4. To each end of the fixed cylinder 2 there is attached an annular gable or flange 7 extending inwardly towards the core 4. Between the inner edge of the flange 7 and the outer surface of the cylindrical core 4 there is mounted a circumferential ring having a cross-sectionally curved surface 9 facing a similarly curved mirror image slide surface on the inner edge of the flange 7 for cooperation therewith and to enable the flange 7 to slide along the curved spherical slide face 9 of the ring on the core 4 when the core is bent to compensate for the stresses acting upon the rotatable roll mantle 1 and thus also upon the fixed mantle 2.

Each flange 7 is fixed to the core 4 by means of a key 8 so as to prevent the flange or gable 7 from rotating with the rotatable mantle 1 mounted around the fixed mantle 2 by means of bearings 6.

1. A press roll having a rotatable cylinderical roll mantle, a hollow fixed supporting axle inside the mantle, at least one pressure cylinder, at least one aperture in said axle for each said pressure cylinder, one end of said pressure cylinder attached to the inside of the hollow axle and the other end of said pressure cylinder extending through said aperture and being adopted to project towards a press nip and cooperate with the cylindrical roll to control the profile thereof, a coaxial cylindrical mantle between the rotatable roll mantle and the supporting axle and adapted to be actuated by the other end of the pressure cylinder, means for fixedly mounting the coaxial cylindrical mantle on the supporting axle, and bearings in the interstice between the rotatable cylindrical roll mantle and the non-rotatable coaxial cylindrical mantle.

2. A press roll as recited in claim 1 and having a plurality of pressure cylinders, wherein the pressure cylinders are parallel to each other and arranged in one row along the inner side of the hollow axle opposite the press nip.

3. A press roll as recited in claim 2, further comprising means for separately actuating each pressure cylinder.

4. A press roll as recited in claim 1, further comprising axially extending rail means attached to the coaxial cylindrical mantle between said other end of the pressure cylinder and said coaxial cylindrical mantle.

5. A press roll having a rotatable cylindrical roll mantle, a fixed supporting axle inside the mantle, and at least one pressure cylinder with one end attached to the supporting axle and the other end being adapted to project towards a press nip and cooperate with the cylindrical roll to control the profile thereof, a coaxial cylindrical mantle between the rotatable roll mantle and the supporting axle and adapted to be actuated by the other end of the pressure cylinder; means for fixedly mounting the coaxial cylindrical mantle in the supporting axle comprising a flange attached to each end of the coaxial cylindrical mantle and having a cross-sectionally spherical slide surface facing the supporting axle, a ring attached to the supporting axle between the same and each flange and having a cross-sectionally spherical slide surface adapted to cooperate with the corresponding slide surface on the flange, and means for interlocking the position of the coaxial cylindrical mantle and the supporting axle in respect to each other; and bearings in the interstice between the rotatable cylindrical roll mantle and the non-rotatable coaxial cylindrical mantle.

* * * * *